United States Patent

[11] 3,617,853

| [72] | Inventors | Yohichi Kawashima<br>Gifu-shi;<br>Hisami Mitsueda, Mie-gun, both of Japan |
|---|---|---|
| [21] | Appl. No. | 841,917 |
| [22] | Filed | July 15, 1969 |
| [45] | Patented | Nov. 2, 1971 |
| [73] | Assignee | Nippon Denso Kabushiki Kaisha<br>Kariya-shi, Japan |
| [32] | Priority | Sept. 26, 1968 |
| [33] | | Japan |
| [31] | | 43/69673 |

[54] BATTERY VOLTAGE REGULATING SYSTEM USING A TRANSISTOR SWITCHING CIRCUIT
6 Claims, 6 Drawing Figs.

[52] U.S. Cl. .................................................. 320/61,
320/48, 322/28, 322/99
[51] Int. Cl. ........................................................ H02j 7/14
[50] Field of Search............................................ 322/28, 73,
99; 320/61, 64, 48

[56] References Cited
UNITED STATES PATENTS

| 3,560,840 | 2/1971 | Stalp | 322/28 X |
| 3,487,284 | 12/1969 | Cady | 320/DIG. 2 UX |
| 3,515,978 | 6/1970 | Williams et al. | 322/28 |
| 3,230,443 | 1/1966 | Hallidy | 322/28 |
| 3,332,003 | 7/1967 | Hetzler | 322/28 |
| 3,363,167 | 1/1968 | Szabo et al. | 322/28 |
| 3,366,842 | 1/1968 | Lund | 322/28 |
| 3,378,708 | 4/1968 | Baker | 322/28 |
| 3,378,753 | 4/1968 | Poppinger et al. | 322/28 |
| 3,447,065 | 5/1969 | Kuhn | 322/28 |
| 3,463,997 | 8/1969 | Dietl et al. | 322/28 |
| 3,467,853 | 9/1969 | Harland, Jr. et al. | 322/28 |
| 3,477,015 | 11/1969 | Kuhn | 322/73 |
| 3,479,575 | 11/1969 | Wright et al. | 322/99 |

*Primary Examiner*—J. D. Miller
*Assistant Examiner*—John M. Gunther
*Attorney*—Cushman, Darby & Cushman ABSTRACT: This specification discloses improvements in or relating to a power source system comprising a three-phase AC generator, a three-phase full-wave rectifier for rectifying the output from the three-phase AC generator, a battery connected with the output terminal of the three-phase AC generator, and a voltage regulating system for controlling the excitation of the generator so as to maintain the terminal voltage of the battery at a predetermined value. The improvements particularly relate to the voltage regulating system, and lie in that a transistor switching circuit is provided with feedback to cause a switching hysteresis for minimizing high-frequency switching noise while the source voltage of the transistor voltage regulating system which has hitherto been derived from a three-phase full-wave rectifier circuit, is derived from a two-phase full-wave rectifier circuit, to provide a periodic off-time for preventing undue battery voltage deviations that might otherwise be caused by such switching hyteresis and in order to economize the number and size of components to be used, and to improve the regulating characteristic as well as to facilitate the compact construction of the entire system.

INVENTORS
Yohichi Kawashima
Hisami Mitsueda
BY Cushman, Darby & Cushman
ATTORNEYS

BATTERY VOLTAGE REGULATING SYSTEM USING A TRANSISTOR SWITCHING CIRCUIT

This invention generally relates to a battery voltage regulating system in which electric charging is effected by a DC current supplied from a three-phase AC generator through a rectifier while the terminal voltage of a battery supplying a DC current to a load is maintained at a predetermined value.

In the known battery voltage regulating system which has heretofore been used, as will be later described in greater detail with respect to the accompanying drawings, the power source voltage of the regulating system was derived through a three-phase rectifier. In this arrangement, the switching circuit is apt to be misoperated by noise produced at commutation times, which noise may cause a high-frequency pulsating component during the operation of the battery voltage regulating system, and a large capacitor was then required to reduce the effect of such pulsating components on the switching circuit. This led to a longer switching time for the switching transistor which in turn, resulted in increased heating effects in the transistor as should be apparent to those in the art. Also, in such battery voltage regulating system according to the prior art, the operation of the switching transistor was unstable, and to prevent such unstable operation it was necessary further to increase the capacity of the capacitor, and this of necessity involved a further increased heating heating of the switching transistor. It was therefore extremely difficult to construct such a battery voltage regulating system by the use of an integrated circuit.

Accordingly it is an object of the present invention to eliminate the above-mentioned drawbacks of the prior art battery voltage regulating system and provide an improved battery voltage regulating system of much more simplified construction that is stable in operation, which has a good voltage regulation characteristic, and which suffers less from heating of the switching transistor.

It is another object of the present invention to provide a voltage regulating system which can be constructed by the use of an integrated circuit.

In order to achieve these objects, there is provided according to the present invention a battery voltage regulating system which comprises a three-phase AC generator for charging a battery, a rectifier circuit for fullwave rectifying the output from said three-phase AC generator, and a transistor switching circuit for detecting the terminal voltage of said battery and intermittently interrupting the field current from said three-phase AC generator, whereby the circuit constants are chosen to result in a switching hysteresis larger in magnitude than the noise components and wherein; two phases of the three-phase output from said three-phase AC generator are fullwave rectified and applied to the source voltage applying terminals of said transistor switching circuit so as to force the source voltage of said transistor switching circuit to be zero for a predetermined time to thus minimize undue battery voltage deviation that might otherwise result from the high value of switching hysteresis.

Other objects and features of this invention will be clarified by the following description given with reference to the accompanying drawings, in which.

Description will first be made in detail of a typical battery voltage regulating system according to the prior art.

Figure 1:
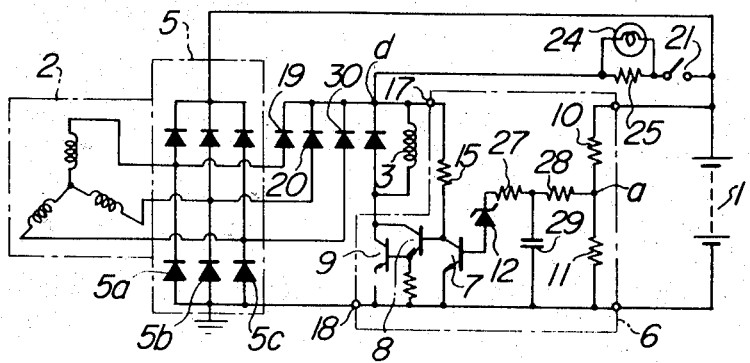
FIG. 1 is a block diagram for illustrating the battery voltage regulating system according to the prior art.

Referring to FIG. 1, the terminal voltage $V_B$ of a battery 1 is divided by resistors 10 and 11 and the high-frequency component contained in the voltage is cut off by a low-range filter formed of resistors 27 and 28 and a capacitor 29 provided to prevent any malfunction. The voltage derived at point $a$ by dividing the said terminal voltage $V_B$ of the battery 1 is applied to a constant-voltage diode 12 through resistors 28 and 27. When the voltage at the point $a$ becomes higher than the yield voltage $V_Z$ of the constant-voltage diode 12, a transistor 7 is rendered conductive and thereby transistors 8 and 9 connected together in Darlington fashion are rendered nonconductive to cut off the current passing through a field winding 3, so that the power generating operation of a three-phase AC generator 2 is stopped to prevent the terminal voltage $V_B$ of the battery 1 from exceeding a predetermined value. When the terminal voltage of the battery 1 drops due to he power supply therefrom to the load and the voltage at the point $a$ becomes lower than the yield voltage $V_Z$ of the constant-voltage diode 12, the transistors are rendered conductive to allow a current again to pass the field winding, whereby the charging from the three-phase AC generator 2 to the battery 1 is started. The above-described operation is repeated to thereby maintain the terminal voltage $V_B$ of the battery 1 at a predetermined value. During the generating operation of the three-phase AC generator 2 the positive pole of the battery 1 is substantially at the same potential as that at point $d$, and therefore a lamp 24 for indicating the noncharging state is not lighted. When the three-phase AC generator 2 is not effecting the charging to the battery 1 as in the case of nonpower-generating time, the potential at the point $d$ is 0 so that a current passes to the point $d$ from the positive pole of the battery 1 to light the lamp 24 for indicating the noncharging state, that is, to indicate that no electric charging to the battery 1 is being effected.

In the known battery voltage regulating system described above, however, a three-phase output from the three-phase AC generator 2 is applied across the source voltage applying terminals 17 and 18 of a transistor switching circuit 6 through diodes 5a, 5b and 5c and diodes 9, 20 and 30 in a three-phase fullwave rectifier circuit 5 which rectifies the said three-phase output, and this leads to a disadvantage not only that the said three diodes 19, 20 and 30 are required but also that the wiring is very much complicated.

When the transistors 8 and 9 are conductive, a passes through the field winding 3, as described above, through the diodes 10, 20 and 30. If the transistors 8 and 9 are switched off, current passes between the collector and emitter of the transistor 7 through the resistor 15 while the remaining portion of the current from the generator source is charged to he battery 1 in the form of an output from the three-phase fullwave rectifier circuit 5. If the transistor switching circuit is thus continuously energized, transient commutation noise often causes the terminal voltage of the battery to exhibit a high-frequency pulsating component which requires a filter in the transistor switching circuit 6 so as to prevent such high-frequency pulsating components from adversely affecting the switching action. Further, the use of a capacitor 29 in the low-range filter leads to a longer switching time for the transistor 7 and for the transistors 8 and 9, which in turn leads to a disadvantage of increased heating of these transistors during the switching time thereof. As described previously, the terminal voltage $V_B$ of the battery 1 normally includes a pulsating component in accordance with the switching hysteresis $\Delta V$ of the transistor switching circuit 6, that is, the difference $\Delta V$ between the voltage at which the transistor 7 or the transistors 8 and 9 are rendered conductive and the voltage at which these transistors are switched off. A pulsating component in the terminal voltage $V_B$ of the battery results in the drawbacks as previously mentioned, and therefore the switching hysteresis $\Delta V$ of the transistor switching circuit 6 is ordinarily set to a small value. If, however, the switching hysteresis $\Delta V$ is set to small value, the pulsating noise component, which has passed through the low-pass filter causes the transistor switching circuit 6 to be repeatedly switched on and off at a high frequency unless the cutoff frequency of the low-pass filter is further decreased. For this reason, the capacitor 29 ordinarily in use must have a large capacity. The large capacity of the capacitor 29 then results in a longer switching time and accordingly involves increased heating of the transistors. In addition, as many as three diodes 19, 20 and 30 are required to apply the source voltage to the transistor switching circuit 6 and the capacitor 29 is also required to be provided, and this means that it becomes very difficult to provide a compact system by incorporating an integrated circuit.

The present invention can eliminate these disadvantages and drawbacks that have existed in the prior art battery voltage regulating system.

Description will now be made of the present invention with respect to the various embodiments thereof.

Figure 2:
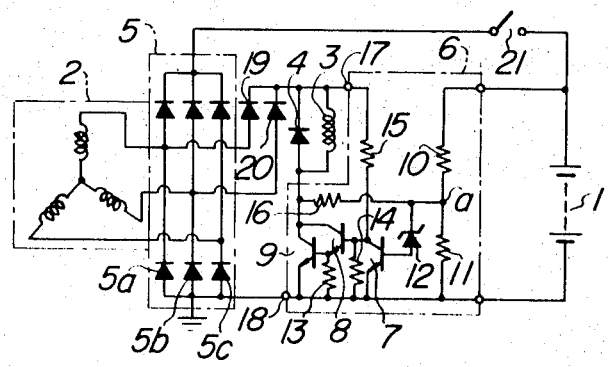
FIGS. 2, 3 and 4 are block diagrams for illustrating the examples of the battery voltage regulating system according to the present invention.

Referring to FIG. 2 which shows a first embodiment of the present invention, there are shown a battery 1, a three-phase AC generator 2 which is the charging source for the battery 1, a field winding 3 of the generator 2, a diode 4 for absorbing the counter electromotive force produced in the field winding 3, and a three-phase fullwave rectifier circuit 5 for rectifying the three-phase AC output from the three-phase AC generator 2. Provision is also made for a transistor switching circuit 6, and transistors 7, 8 and 9 adapted to effect switching action. The transistors 8 and 9 are connected together in Darlington fashion to provide a greater amplification constant. There are further provided resistors 10 and 11 for dividing the terminal voltage of the battery 1, and a constant-voltage diode 12 which is adapted to compare its own yield voltage $V_Z$ with the voltage $V_a$ at point $a$ where the resistors 10 and 11 are connected together. As seen, the arrangement is made such that the terminal voltage of the battery 1 is detected by the resistors 10 and 11 and the constant-voltage diode 12. Provision is also made for bias resistors 13 and 14, a resistor 15, and a resistor 16 for applying a positive feedback to the point $a$ from the collectors of the transistors 8 and 9. Source voltage applying terminals 17 and 18 are provided in the transistor switching circuit 6, and diodes 19 and 20 which, together with diodes 5$a$ and 5$b$ of the three-phase fullwave rectifier circuit 5, constitute a rectifier circuit adapted to fullwave rectification of two phases of the three-phase output from the three-phase AC generator 2 and to apply the thus fullwave rectified phases across the said source voltage applying terminals 17 and 18. The numeral 21 indicates a power source switch.

Discussion will now be made about the operation of the above-described system according to the present invention. The system of the present invention is adapted, as is the case with a battery mounted in a motor vehicle, for charging the battery from a charge source while supplying a DC current to the load during the charging operation. First, the manner in which the field current of the three-phase AC generator 2 is switched on and off intermittently by the action of the transistor switching circuit 6 will be outlined. If the three-phase AC generator 2 is in its nonoperative condition and the potential at the point $a$ derived by dividing the terminal voltage $V_B$ of the battery 1 assumes a value lower than the yield voltage $V_Z$ of the constant-voltage diode 12, then the transistor 7 is in the OFF state because no base current path is formed therein. Accordingly, the transistors 8 and 9 for applying a positive feedback to the base of the transistor 7 through the constant-voltage diode 12 are in condition to turn to the ON state except for the fact that no source voltage is applied across the source voltage applying terminals 17 and 18 from the three-phase AC generator due to its present nonoperative condition. If the power switch 21 is closed to drive the armature of the three-phase AC generator 2 as through an internal combustion engine mounted in a motor vehicle, the three-phase AC generator 2 will start power generation due to the excitation caused by the residual magnetism in a field core having the field winding 3 wound thereon, and concurrently therewith a current consisting of two phases of the three-phase AC output fullwave rectified by the diodes 19, 20 and 5$a$, 5$b$ is applied to the base of the transistor 8 through the resistor 15. Thereby the transistor 8 is rendered conductive, then the transistor 9 is also rendered conductive, so that substantially all of the said fullwave rectified current passes into the field winding 3. As a result, the three-phase AC generator 2 is more and more energized for power generation by the excitation due to the current passing the field winding 3, and the generated voltage grows higher. Also, as a result of the fact that the transistors 8 and 9 are rendered conductive, the collector voltages of these transistors become substantially zero and this zero voltage is applied in the form of a positive feedback (thereby substantially increasing the switching to the base of the transistor 7 through the resister 16. Therefore the transistor 7 is brought into a complete OFF state. Thus, when the DC voltage derived by rectifying the generated voltage of the three-phase AC generator 2 by means of the three-phase fullwave rectifier circuit 3 exceeds the terminal voltage $V_B$ of the battery 1, the battery 1 starts to be charged. As a result, the terminal voltage $V_B$ of the battery 1 gradually increases. However, if the potential at the point $a$ divided from the said terminal voltage $V_B$ by the resistors 10 and 11 exceeds the yield voltage $V_Z$ of the constant-voltage diode 12 as the terminal voltage $V_Z$ of the battery 1 is increased, there is formed a base current path in the transistor 7 through the constant-voltage diode 12 and thereby the transistor 7 is brought into the ON state while the transistors 8 and 9 are brought into the OFF state. As a consequence there is no current passing through the field winding 3 and the current passing through the diodes 19 and 20 now passes through the collector and emitter of the transistor 7. Thus the generated voltage of the three-phase AC generator 2 sharply decreases because the excitation due to the field current is nullified, and the power generation is slightly effected only by the residual magnetism in the field core but not sufficiently to charge the battery 1. Therefore the terminal voltage $V_B$ of the battery 1 does not exceed a certain value, that is, it is limited to a predetermined value. The operation as described above is repeated thereafter whereby the terminal voltage $V_B$ of the battery 1 may be maintained at a predetermined value.

Figure 5:
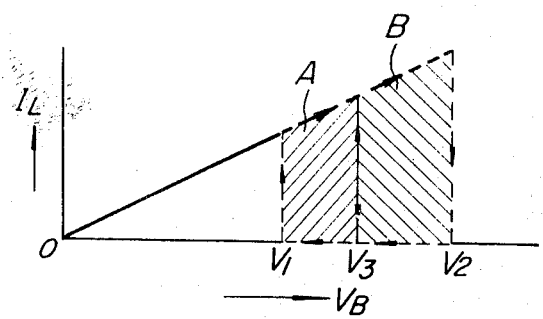
FIG. 5 is a graph illustrating the relation between the filed current of the three-phase AC generator controlled by the system of the present invention and the terminal voltage of the battery.
Figure 6:
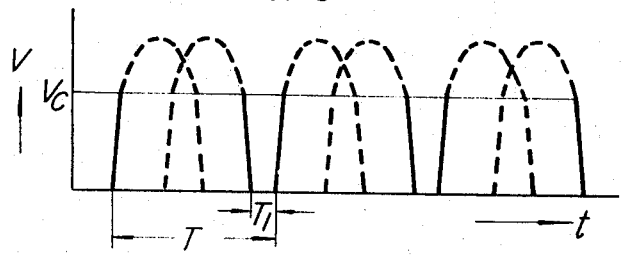
FIG. 6 is a graph illustrating the waveform of the power source voltage applied to the transistor switching circuit in the system of the present invention.

Description will now turn to the switching action of the switching circuit 6 and takes place during the described operation, with reference to FIGS. 5 and 6.

FIG. 5 shows the relation between the terminal voltage $V_B$ of the battery 1 and the field current $I_L$ passing the field winding 3, the terminal voltage $V_B$ being represented by the abscissa and the field current $I_L$ and being represented by the ordinate. FIG. 6 illustrates the waveform of the source voltage when two phases of the three-phase output from the three-phase AC generator 2 are fullwave rectified by the diodes 19 and 20 and the diodes 5$a$ and 5$b$ and applied across the source voltage applying terminals 17 and 18 of the transistor switching circuit 6. In this FIG. the abscissa represents the time $t$ and the ordinate represents the voltage $V$, and $V_C$ on the ordinate is substantially equal to the terminal voltage $V_B$ of the battery 1 which is, of course, substantially limited to a predetermined value. In order that the transistors 8 and 9 may be rendered conductive, the transistor 7 must be switched off, that is, there must be a relation that the potential at the point $a$ is smaller than the yield voltage $V_Z$ of the constant-voltage diode 12 and $V_a \leq V_Z$. When the transistors 8 and 9 are in the OFF state, the voltage at 17 is substantially equal to the voltage at the positive terminal of battery 1. Therefore, the resistors 16 and 10 are deemed to be in parallel under these conditions. Hence, if the resistance values of the resistors 10, 11 and 16 are $r_{10}$, $r_{11}$, and $r_{16}$ respectively, the aforementioned relation $V_a \leq V_Z$ may be expressed as follows:

$$V_a = \frac{r_{11}}{r_{11} + \frac{r_{16} r_{10}}{r_{16} + r_{10}}} V_B \leq V_Z \qquad (1)$$

From the equation (1), the terminal voltage $V_1$ of the battery 1 when the transistors 8 and 9 shift from the OFF state to the ON state namely, $V_1$ on the horizontal axis of FIG. 5, may be given as follows:

$$V_1 = \left[ \frac{r_{11} + \frac{r_{16} \cdot r_{10}}{r_{16} + r_{10}}}{r_{11}} \right] V_z = \left[ \frac{r_{10} \cdot r_{11} + r_{11} \cdot r_{16} + r_{10} \cdot r_{16}}{r_{11}(r_{10} + r_{16})} \right] V_z \qquad (2)$$

Conversely, the terminal voltage $V_2$ of the battery 1 when the transistors 8 and 9 shift from the ON state to the OFF state, namely, $V_2$ on the horizontal axis of FIG. 5, may be obtained by the following equation since one end of the resistor 16 is grounded through the resistor 9 when the transistors 8 and 9 are in the ON state. Then the voltage $V_a$ at the point $a$ is:

$$V_a = \left[ \frac{\frac{r_{11} \cdot r_{16}}{r_{11} + r_{16}}}{\frac{r_{11} \cdot r_{16}}{r_{11} + r_{16}} + r_{10}} \right] V_B \quad (3)$$

From the equation (3) the switching value of $V_B$ is obtained by solving the above:

$$V_2 = \left[ \frac{\frac{r_{11} \cdot r_{16}}{r_{11} + r_{16}} + r_{10}}{\frac{r_{11} \cdot r_{16}}{r_{11} + r_{16}}} \right] V_z = \left[ \frac{r_{10} \cdot r_{11} + r_{11} \cdot r_{16} + r_{10} \cdot r_{16}}{r_{11} \cdot r_{16}} \right] V_z \quad (4)$$

Hence, the switching hysteresis $\Delta V$ of the transistor switching circuit 6, that is, the difference $\Delta V$ between the voltage at which the transistors 8 and 9 intermittently controlling the field current are rendered conductive and the voltage at which these transistors 8 and 9 are rendered nonconductive, will equal a value obtained by subtracting the equation (3) from the equation (2). That is, $$\Delta V = V_2 - V_1 = \frac{(r_{10}r_{11} + r_{11}r_{16} + r_{10}r_{16})r_{10}}{(r_{10} + r_{16})r_{11}r_{16}} V_z \quad (5)$$

The switching hysteresis $\Delta V$ derived from the equation (5) is represented in an open-loop form as shown by the broken lines in FIG. 5. The said hysteresis $\Delta V$ may also be made into a value [V by suitably selecting the resistance values of the resistors 10, 11 and 16. Thereby, even if a high-frequency pulsating is produced in the terminal voltage $V_B$ of the battery 1 if the hysteresis is larger than the high frequency pulsating voltage, then such pulsating would not cause the transistor switching circuit 6 to oscillate at a high frequency. Therefore no additional provision is needed for a low-range filter for cutting off the high-frequency pulse in the switching circuit.

The transistor switching circuit 6 having the said hysteresis $\Delta V$ is not free from the pulsating produced in the voltage $V_B$ of the battery 1 when it effects its switching action. The voltage applied across the source voltage applying terminals 17 and 18 of the transistor switching circuit 6 is of a rectangular-waveform pulse as shown in FIG. 6, and in synchronism with the two-phase output from the periodic energization means or the two phase rectifier connected to the three-phase AC generator 2, the voltage applied to the transistor switching circuit 6 is forced to be 0 for one-third of a cycle of each phase, namely, for a time, $t_1=1/6T$. At this stage one end of the resistor 16 is grounded through the diode 4 and the resistors 15 and 14, and the voltage $V_a$ now at the point $a$ will be expressed by the circuit constants of the circuits arranged so as to be conductive with each other, as follows:

$$V_a = \left[ \frac{\frac{r_{11}(r_{14} + r_{15} + r_{16} + r_D)}{r_4 + r_{11} + r_{15} + r_{16} + r_D}}{r_{10} + \frac{r_{11}(r_{14} + r_{15} + r_{16} + r_D)}{r_{11} + r_{14} + r_{15} + r_{16} + r_D}} \right] V_B \quad (6)$$

where $r_D$ is the forward resistance value of the diode 4 and $r_{14}$ and $r_{15}$ are the resistance values of the resistors 14 and 15 respectively. At this stage the terminal voltage $V_3$ of the battery is given below by the equation (6).

$$V_3 = \frac{r_{10} + \frac{r_{11}(r_{14} + r_{15} + r_{16} + r_D)}{r_{11} + r_{14} + r_{15} + r_{16} + r_D}}{\frac{r_{11}(r_{14} + r_{15} + r_{16} + r_D)}{r_{11} + r_{14} + r_{15} + r_{16} + r_D}} V_z \quad (7)$$

As above-mentioned, the transistor switching circuit has a switching hysteresis $\Delta V$ as represented by the equation (5) as a result of the feedback resistor 16 connected between the collector of the transistor 9 and the point $a$. The magnitude of the switching hysteresis $\Delta V$ is determined by selecting the resistance values of the resistors 10, 11 and 16. In general, when this circuit is employed together with a three-phase fullwave rectifier and a low hysteresis value, the switching circuit might be actuated by a noise signal produced from the rectifier at commutation, which might produce a high-frequency charging current. In this invention, such high-frequency current can be prevented by determining the switching hysteresis at a value covering the noise voltage. Furthermore, the deviation of the battery voltage derived from the switching hysteresis can be improved by deenergizing the switching circuit for a time equal to 1/6T of each cycle by using only two phases of the three-phase generator for energizing the switching circuit. After the transistors 8 and 9 are switched off by the reduced voltage at the point 17, the switching action of the switching circuit is controlled under the condition represented by the equation (7). In other words, with $V_3$ of the equation (7) as the reference voltage and with such reference voltage $V_3$ as the boundary, the transistor switching circuit 6 effects its switching action to intermittently interrupt the field current. Thus, in FIG. 5, there is the terminal voltage $V_B$ of the battery 1 in the area A shown by the rightwardly upward hatching, the transistor 7 will be in the complete OFF state while the transistors 8 and 9 will be in the complete ON state even if the voltage applied across the source voltage applying terminals 17 and 18 is forced to be 0, since the voltage at the point $a$ is at a smaller value than the yield voltage $V_3$ of the constant-voltage diode 12. Therefore, if a voltage is again applied across the source voltage applying terminals 17 and 18; a current $I_L$ will flow in the field winding 3 through the transistors 8 and 9 to thereby energize the three-phase AC generator 2 for power generation and the terminal voltage $V_B$ of the battery 1 goes steadily upwards. However, if the terminal 74 enters the area B shown by the rightwardly downward hatching, the voltage at the point $a$ will exceed the yield voltage $V_z$ of the constant-voltage diode 12 to suddenly turn on the transistor 7 and turn off the transistors 8 and 9 to stop the passage of the field current $I_L$, and the generated voltage of the three-phase AC generator 2 will suddenly drop. Thus, the terminal voltage $V_B$ of the battery 1 also goes down steadily due to the DC power supply to the load. If the said terminal voltage $V_B$ again enters the area A, the voltage $V_a$ at the point $a$ will go down below the yield voltage $V_z$ of the constant-voltage diode 12 to thereby switch off the transistor 7 and switch on the transistors 8 and 9 again to permit the passage of the field current $I_L$, and the three-phase AC generator 2 starts charging the battery 1. If the elements in the switching circuit are selected so as to make the voltage $V_3$ almost equal to the voltage $V_1$, the switching hysteresis effectively seen by the battery voltage becomes very small.

A second embodiment of the present invention will now be discussed with respect to FIG. 3, in which the circuit elements indicated by numerals 1 to 21 are identical with those used in the above-described first embodiment. Numeral 22 denotes a resistor which forms a resistance element having a resistance value higher than the forward resistance value of the diode 5a of the three-phase fullwave rectifier circuit with which the resistor 22 is connected in parallel. One end of the resistor 22 is connected with the battery 1 through a power source switch 21 and the other end is connected with a point $b$ at the anode side of the diode 19. An ammeter 23 is also provided. In this arrangement, the operation is similar to the described first embodiment in that two phases of the three-phase output from the three-phase AC generator 2 as shown in FIG. 6 is fullwave rectified by the diodes 19, 20, 5a and 5b and applied across the source voltage applying terminals 17 and 18 of the transistor switching circuit and that the field current is controlled to be intermittently interrupted so as to maintain the terminal voltage $V_B$ of the battery 1 at a predetermined level.

Figure 3:
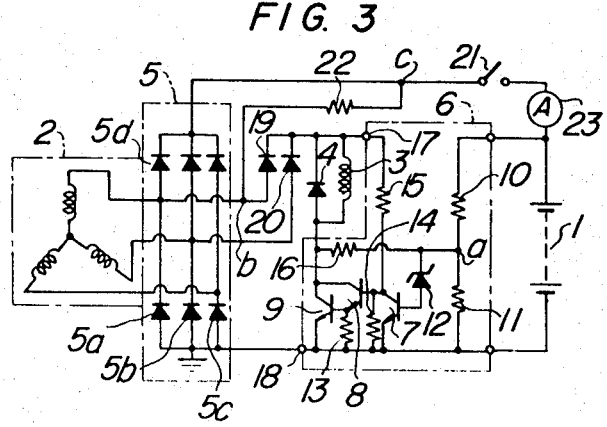

While in the first embodiment shown in FIG. 2 the initial power generation of the three-phase AC generator 2 is accomplished by the initial excitation due to the residual magnetism in the field core having the field winding 3 wound thereon, in the second embodiment of FIG. 3 an initial excitation current is passed, by closing the power source switch 21, into the field winding 3 through the ammeter 23, the power source switch 21, the resistor 22 and the diode 19, whereby the initial power generation of the three-phase AC generator 2 may be effected smoothly. Also, the provision of the ammeter 23 inserted in the charging circuit from the three-phase AC generator 2 to the battery 1 enables the value of the charge current to the battery 1 and that of the discharge current to be read out on the said ammeter 23, and this means a high utility of the ammeter 23. In this case, there is flowing in the ammeter 23 a current slightly containing a pulsating component of the three-phase output from the three-phase AC generator 2 which is fullwave rectified by the three-phase fullwave rectifier circuit 5. However, it has been found from experiments that the presence of such current flowing in the ammeter 23 does not cause the pointer therein to deviate so greatly as to make the readout of the pointer difficult. Moreover, during the power generation in the three-phase AC generator 2, a fullwave rectified one-phase current passes therefrom to the ammeter 23 through the resistor 22, but such current is too small to affect the movement of the pointer in the ammeter 23 because the voltage at the point $b$ at the anode side of the diode 19 substantially equals the voltage at the point $c$ at which the resistor 22 and the power source switch 21 are connected together. Further, when the charging to the battery 1 is not effected as when the three-phase AC generator 2 is not operating for power generation, the voltage at the point $b$ at the anode side of the diode 19 is lower by the value of the voltage drop caused due to the resistor 22 than the terminal voltage $V_B$ of the battery 1. Therefore a current passes the same circuit as that through which the initial excitation current is passed, and thereby the fact that no charging is being effected to the battery 1 can be recognized by the deviation of the pointer in the ammeter 23.

In the operation described above, when the source voltage applied across the source voltage applying terminals 17 and 18 of the transistor switching circuit 6 is forced to be 0, or during the time $T_1$ in the waveform as shown in FIG. 6, since no current passes from the positive pole of the battery 1 to the source voltage applying terminal 17 through the ammeter 23, the power source switch 21, the resistor 22 and the diode 19, no influence is imparted to the waveform of the voltage applied across the terminals 17 and 18 from the battery 1. This is because during the said time $T_1$ the potential at the point $b$ in the anode of the diode 19 is 0 so that the current passing from the positive pole of the battery 1 through the ammeter 23, the power source switch 21 and the resistor 22 passes into the armature winding of the three-phase AC generator 2 which is also at zero potential through the point $b$, but not into the terminal 17.

Figure 4:
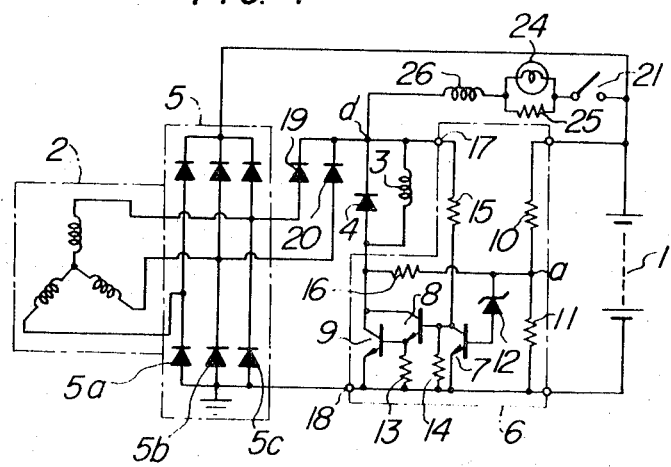

Referring to FIG. 4 description will now be made of a third embodiment of the present invention which is a modification of the described second embodiment. In FIG. 4, the circuit elements indicated by numerals 1 to 21 are the same as those used in the first embodiment. In the third embodiment provision is made of a noncharging indicator lamp 24, a shunt resistor 25 connected in parallel with the lamp 24, and a coil 26 connected in series with the parallel circuit formed of the lamp 24 and the resistor 25. This serial circuit is inserted between the positive pole of the battery 1 and the field winding 3. The resistance component of the resistor 25 and the winding 26 corresponds to the resistor 22 in the described second embodiment. With the arrangement of FIG. 4 it also holds true, as in the first embodiment, that a rectangular-waveform pulse voltage as shown in FIG. 6 is applied across the source voltage applying terminals 17 and 18 of the transistor switching circuit 6 and that the field current is controlled to be intermittently interrupted so as to maintain the terminal voltage $V_B$ of the battery 1 at a predetermined value $V_3$. Again, the initial excitation current passes from the battery 1 to the field winding 3 through the power source switch 21, the noncharging indicator lamp 24, the resistor 25 and the winding 26. Also, during the power generation of the three-phase AC generator 2, the voltage at the positive pole of the battery 1 substantially equals the voltage at the point $d$ at the common cathode side of the diodes 19 and 20, and the value of the current passing from the point $d$ to the positive pole of the battery 1 is too small to light the noncharging indicator lamp 24. However, if the voltage at the positive pole of the battery 1 becomes higher than the voltage at the point $d$, a current passes from the positive pole of the battery 1 through the power source switch 21, the noncharging indicator lamp 24, the resistor 25, the coil 26, the field winding 3 and the transistors 8 and 9, so as to light the noncharging indicator lamp 24, which now indicates that no charging is being effected to the battery 1. Such noncharging indicator lamp 24 may be replaced by an ammeter, which, however, can indicate only digitally the charging or noncharging state.

In this third embodiment, a countermeasure can also be taken in the manner to be described in order to prevent the waveform of the source voltage in the transistor switching circuit 6 from being affected by a current flowing from the positive pole of the battery 1 to the source voltage applying terminal 17 through the power source switch 21, the noncharging indicator lamp 24, the resistor 25 and the coil 26 when the source voltage of the transistor circuit 6 is forced to be 0. This can be accomplished by the use of the coil 26 having an inductance L which has a rising time constant greater than the time $T_1$ in the voltage waveform, as shown in FIG. 6, applied across the source voltage applying terminals 17 and 18. Also, by doing so, a voltage of the waveform as shown in FIG. 6 can always be applied across the source voltage applying terminals 17 and 18 during the power generation of the three-phase AC generator 2. Further, this in turn prevents the occurrence of such erroneous indication that the noncharging indicator lamp 24 is lit every time the voltage applied across the source voltage voltage applying terminals 17 and 18 reaches 0.

As has hitherto been discussed, in the first embodiment of the present invention the provision of the transistor switching circuit adapted to detect the terminal voltage of the battery and intermittently interrupt the field current from the three-phase AC generator which is the charging source of the battery enables the output voltage from the battery charging three-phase AC generator to be controlled by such transistor switching circuit. Also, the fact that two phases of the three-phase output from the three-phase AC generator is fullwave rectified and applied across the source voltage applying terminals of the said transistor switching circuit results in the possibility that the thus applied source voltage is forced to be 0 at one-sixth of a cycle for each of the said two phases. Furthermore, two of the four diodes provided in the rectifier circuit for fullwave rectifying two phases of the three-phase output can be common to two of the six diodes provided in the three-phase fullwave rectifier circuit for converting the AC output voltage of the three-phase AC generator into a DC voltage when the former output voltage is charged into the battery, and this means a great advantage that two additional diodes can be dispensed with and accordingly the wiring can be much more simplified than in the conventional battery voltage regulating system which would require the provision of three such additional diodes. In addition, the circuit constant of the circuits arranged so as to be conductive with each other in the transistor switching circuit determines the switching hysteresis $\Delta V$ that is the difference between the reference voltage for interrupting the field current or the voltage at which the transistors located at the final stage of the transistor switching circuit to interrupt the current field are rendered conductive and the voltage at which such transistors are rendered nonconductive, and this enables the terminal voltage $V_B$ of the battery to be controlled in accordance with the said switching hysteresis. From the fact that the switching hysteresis in turn is determined by the reference voltage at which the field current is intermittently interrupted when the source voltage of the transistor switching circuit is forced to be 0, there results such an excellent effect that even the slightest excess of the terminal voltage of the battery over the said reference voltage causes the field current to be blocked and even the slightest decrease of the said terminal voltage below the said reference voltage causes the field current to pass again, and thus in effect the terminal voltage of the battery may be controlled the reference voltage so as to assume a predetermined value and no pulsating is produced in the terminal voltage of the battery. This also serves to eliminate the necessity of a low-range filter having a capacitor being provided in the transistor switching circuit, and the absence of such capacitor leads to a great advantage that an extremely minimized heating of the transistors is ensured during the switching time which can be much shorter than in the case where such capacitor is inserted in the switching circuit. A further advantage of the present invention is that the transistor switching circuit is free from oscillation at a high frequency caused by the pulsating in the terminal voltage of the battery and any deviation of the pointer in the ammeter is prevented by the insertion of the ammeter in the charging circuit from the three-phase AC generator to the battery, so as to ensure the charge current to be directly read by means of the ammeter. A still further advantage is that the arrangement of the transistor switching circuit without using any capacitor, as in the above-described embodiments, makes it very easy to form the transistor switching circuit into an integrated circuit.

In the second and third embodiments of the present invention, provision is made, in addition to the circuit elements used in the first embodiment, of the element having a certain resistance value connected between the battery and the rectifier circuit for fullwave rectifying two phases of the three-phase output from the three-phase AC generator, and this results not only in the ability to obtain the effect of the first embodiment but also in the ability to pass the initial excitation current into the field winding of the three-phase AC generator through the said element and the said rectifier circuit. This means that the power generation of the three-phase AC generator can be started smoothly without resorting to the residual magnetism in the field core having the field winding wound thereon. Also, the element connected between the rectifier circuit and the battery enables, when the source voltage of the transistor switching circuit is forced to be 0, the current passing from the battery through the said element to pass into the armature winding of the three-phase AC generator which is at the 0 potential, and no influence is imparted to the source voltage of the transistor switching circuit.

What is claimed is

1. A battery voltage regulating system comprising
 a three-phase AC generator having armature windings and a field winding,
 a three-phase fullwave rectifier for rectifying the three-phase output of said generator and for charging a battery,
 a transistor switching circuit connected to said field winding for switching the current therethrough and thereby controlling the output of said generator,
 said transistor switching circuit having a positive feedback circuit means for causing a substantial degree of switching hysteresis therein, and
 a two phase rectifier for rectifying only two phases of said generator output and for energizing said switching circuit such that there are periodic off-times of switching circuit energization to minimize undue voltage deviation that might otherwise result from the switching hysteresis.

2. A system as in claim 1 further comprising a resistor means connected between an AC terminal of said two-phase rectifier and a terminal of said battery for supplying an initial excitation current to said field winding.

3. A system as in claim 1 wherein said transistor switching circuit comprises:
 a first transistor which is actuated by comparison between the battery voltage and a reference voltage, and
 a Darlington-connected transistor circuit which is actuated by said first transistor but in an opposite sense thereto, and wherein said field winding of said generator is connected in series with an emitter-collector output of said Darlington-connected transistor circuit and,
 said positive feedback circuit means is connected between a base electrode of said first transistor and a collector output electrode of said Darlington-connected transistor circuit.

4. An improved battery voltage regulating system for regulating the output of a battery charging dynamo means by switching field winding dynamo current with a transistor switching circuit wherein undesirable high-frequency switching often caused by dynamo commutation noise is avoided without resulting in undue deviation of the regulated battery voltage, said improvement comprising:
 positive feedback means associated with said transistor switching circuit for producing a substantial degree of positive feedback and hence switching hysteresis such that said switching circuit is no longer sensitive to said commutation noise, and
 periodic energization means associated with said transistor switching circuit for periodically providing an off-time during which the switching point of said circuit is altered to eliminate undue battery voltage deviations that might otherwise by caused by said substantial switching hysteresis.

5. An improvement as in claim 4 wherein said feedback means comprises an impedance means connected between an input and an output of said transistor switching circuit to produce positive feedback therebetween.

6. An improvement as in claim 4 wherein said periodic energization means comprises a two-phase rectifier connected to said dynamo means for rectifying only two phases of electrical output therefrom.

* * * * *